(12) United States Patent
Sim

(10) Patent No.: US 8,605,596 B2
(45) Date of Patent: Dec. 10, 2013

(54) MEDIUM ACCESS FOR DE-CENTRALIZED WIRELESS NETWORK

(75) Inventor: Hong Cheng Michael Sim, Singapore (SG)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 965 days.

(21) Appl. No.: 11/721,808

(22) PCT Filed: Dec. 20, 2004

(86) PCT No.: PCT/SG2004/000422
§ 371 (c)(1),
(2), (4) Date: Aug. 21, 2007

(87) PCT Pub. No.: WO2006/068621
PCT Pub. Date: Jun. 29, 2006

(65) Prior Publication Data
US 2009/0238153 A1 Sep. 24, 2009

(51) Int. Cl.
*H04W 4/00* (2009.01)

(52) U.S. Cl.
USPC ............ 370/241; 370/254; 370/338; 370/345

(58) Field of Classification Search
None
See application file for complete search history.

(56) References Cited

U.S. PATENT DOCUMENTS

| | | | |
|---|---|---|---|
| 6,625,462 B1 | 9/2003 | Arnold | |
| 2002/0122410 A1* | 9/2002 | Kulikov et al. | 370/349 |
| 2002/0123345 A1* | 9/2002 | Mahany et al. | 455/432 |
| 2004/0233936 A1* | 11/2004 | Cheng | 370/509 |
| 2005/0047428 A1* | 3/2005 | Park et al. | 370/445 |
| 2005/0085261 A1* | 4/2005 | Sugaya | 455/552.1 |
| 2008/0232286 A1* | 9/2008 | Habetha et al. | 370/311 |
| 2008/0259895 A1* | 10/2008 | Habetha et al. | 370/345 |

FOREIGN PATENT DOCUMENTS

| | | |
|---|---|---|
| EP | 1087567 A2 | 3/2001 |
| GB | 2366138 A | 2/2002 |
| WO | 2004071019 A1 | 8/2004 |

* cited by examiner

*Primary Examiner* — Kevin C Harper
(74) *Attorney, Agent, or Firm* — Thomas A. Runk; Fulwider Patton LLP

(57) ABSTRACT

A method of wireless medium access for establishing a decentralized wireless network, the method comprising broadcasting of beacon frames by each of a plurality of devices; listening, at each device, for beacon frames of other devices; identifying, at each device, other devices who's beacon frames have been heard; and forming the decentralised wireless network as at least two dynamic networks, each dynamic network being centered around one of the devices and having said other devices who's beacon frames have been heard by said one device as network members.

17 Claims, 11 Drawing Sheets

|      | Dev 1 | Dev 2 | Dev 3 | Dev 4 | Dev 5 | Dev 6 | Dev 7 |
|------|-------|-------|-------|-------|-------|-------|-------|
| Dev 1 | -   | ✓ | ✓ | ✓ | ✓ | X | X |
| Dev 2 | ✓ | - | ✓ | X | X | X | X |
| Dev 3 | ✓ | ✓ | - | ✓ | X | X | ✓ |
| Dev 4 | ✓ | X | ✓ | - | X | X | ✓ |
| Dev 5 | ✓ | X | X | X | - | X | X |
| Dev 6 | X | X | X | ✓ | X | - | ✓ |
| Dev 7 | X | X | X | ✓ | X | ✓ | - |

Figure 2 (b)

|       | Member devices in the network |
|-------|-------------------------------|
| Dev 1 | Dev 1, Dev 2, Dev 3, Dev 4, Dev 5 |
| Dev 2 | Dev 1, Dev 2, Dev 3 |
| Dev 3 | Dev 1, Dev 2, Dev 3, Dev 4 |
| Dev 4 | Dev 1, Dev 3, Dev 4, Dev 7 |
| Dev 5 | Dev 1, Dev 5 |
| Dev 6 | Dev 6, Dev 7 |
| Dev 7 | Dev 4, Dev 6, Dev 7 |

Figure 2 (c)

MEDIUM ACCESS FOR DE-CENTRALIZED WIRELESS NETWORK

FIELD OF INVENTION

The present invention relates broadly to a method of wireless medium access for establishing a decentralised wireless network, and to a decentralised wireless network.

BACKGROUND

The Open System Interconnection (OSI) standard established by the International Standards Organization (ISO) provides a seven-layered hierarchy between an end user down to a physical device through which different systems can communicate. Each of these seven layers performs different tasks and they are specified by the OSI standard for their inter-layer as well as inter-device interaction.

The physical layer defines the physical and electrical characteristics of the network. It provides the hardware means of sending and receiving data on a carrier. The data link layer defines the access strategy for sharing the physical medium. It also describes the representation of bits on the physical medium as well as defining the format of messages on the medium. In addition, it is also responsible for proper synchronization of data sending in blocks (or frames). The network layer provides a means for communicating open systems to establish, maintain and terminate network. In addition, it also handles routing and forwarding of data to proper destinations. The transport layer manages the end-to-end control and error checking to ensure complete data transfer, data reliability and integrity. The session layer provides for two communicating presentation entities to exchange data with each other. The presentation layer is where application data is packed/unpacked, ready for use by the running application. Protocol conversions, encryption/decryption and graphics expansion also takes place in this layer. The application layer is where end-user and end application protocols such as telnet, ftp and mail (pop3 and smtp) are found. Here, communication partners, quality of service and any constraints on data syntax are identified, and user authentication and privacy are considered.

The Institute of Electrical and Electronics Engineers (IEEE) 802 LAN/MAN committee, which develops Local Area Network (LAN) and Metropolitan Network (MAN) standards, has developed a three-layered architecture that corresponds to the physical layer and data link layer of the OSI standard.

The IEEE 802 standard includes a physical layer (PHY), which essentially has the same role and functionalities as the physical layer of the OSI standard. The data link layer of the OSI standard is broken down into media access control (MAC) layer and logical link control (LLC) layer. Together, the MAC layer and LLC layer shares the same functionality of the data link layer of the OSI standard. Individually, the LLC layer places data into blocks/frames that can be communicated at the PHY layer whereas the MAC layer manages communication over the data link, data transmission and reception, as well as data acknowledgement (ACK) frames.

FIG. 1 shows the block diagram of two wireless networks, for example (100) and (102), each is wireless personal area network (WPAN) that could use the IEEE 802 standard. Both networks apply to network settings whereby bandwidth is to be shared among several users, such as wireless local area networks (WLAN), or any other appropriate wireless network.

In FIG. 1, the first network (100), for example a WPAN, consists of a central controller (104) of the first network (100), as well as dependent devices, for example (106), (108), (110), (112), that connect to the central controller (104). The radio range (114) of the central controller (104) determines the overall coverage of the first network (100). Each device, for example (106), (108), (110), (112) in the first network (100) is able to communicate via unidirectional/bi-directional radio links, for example (116), (118), (120), (122) with the central controller (104). Devices connected to the first network (100) may establish direct peer-to-peer unidirectional/bi-directional links, for example (124), (126) with each other for communication, depending on their radio range or security issues. The central controller (104) controls the time allocation and the media access of the first network (100).

Typical wireless networks like the ones illustrated in FIG. 1, that each has a central controller to which other dependent devices connects to, use a MAC layer based on centralized control. One such example of centralized MAC is the IEEE 802.15.3 High Speed WPAN standard. Centralized control schemes for MAC layer have the key advantage of predictability of data throughput performance. This is due to the fact that the central controller allocates and manages the media usage of all devices in the network. However, centralized control schemes pose problems as described below.

The main problem of a centralized control is the dependency of all devices on a central entity for timing allocation. When the central control device goes out of range or switched off, the wireless network collapses unless another device takes over the role of the central controller. Such situations may occur frequently especially in ad hoc networks where devices are highly mobile. Thus, a centralized control based MAC layer is not suitable for ad hoc networks where the devices are highly mobile.

A second problem with a centralized control scheme is that devices in such a network are not guaranteed to be able to communicate with peer devices also in the same network, due to limited radio range. Being in a centralized network only ensures that each device is able to communicate with the central controller. With reference to FIG. 1, device 5 (112) is in the WPAN (100). To device 5 (112), device 1 (104), 2 (106), 3 (108) and 4 (110) are also in the same WPAN (100). Yet, device 5 (112) can only communicate with device 1 (104) and not the rest of the members of the WPAN (100) due to its range limitation.

A third problem with a centralized control scheme is illustrated using FIG. 1. Here, the network environment (128) consists of, for example two WPANs (100) and (102) respectively, centred around controllers device 1 (104) and device 6 (130) respectively. Due to the fact that device 4 (110) and device 7 (132) belong to different WPANs, ie. (100) and (102) respectively, they are not able to communicate although they are positionally close to each other. From an end user point of view, for the case of an ad hoc device, this is an inconvenience issue. For example, a typical such scenario will be when a Personal Digital Assistant (PDA) device placed by a user onto a desk in the office near a notebook PC and digital camera only for the user to find that the PDA can only communicate with the digital camera because the notebook PC is a member of a separate WPAN centred around another wireless device further away.

A fourth problem associated with a network based around a central controller is the issue of interference from neighbour networks. With reference to FIG. 1, device 4 (110) is out of range of device 6 (130), which is the central controller of WPAN (102). Likewise for device 7 (132), it is out of range of device 1 (104), which is the central controller of WPAN (100). This means that device 1 (104) and device 6 (130) has no idea of the existence of device 7 (132) and device 4 (110) respectively as well as their relative close proximity, due to both belonging to different networks, for example (100) and (102). Therefore, interference may occur when device 1 (104) or device 3 (108) sends data to device 4 (110) and simultaneously, when device 7 (132) sends data to device 6 (130). Since device 7 (132) is relatively close to device 4 (110), interference may be experienced at the receiving device 4 (110).

SUMMARY

In accordance with a first aspect of the present invention there is provided a method of wireless medium access for establishing a decentralised wireless network, the method comprising broadcasting of beacon frames by each of a plurality of devices; listening, at each device, for beacon frames of other devices; identifying, at each device, other devices who's beacon frames have been heard; and forming the decentralised wireless network as at least two dynamic networks, each dynamic network being centred around one of the devices and having said other devices who's beacon frames have been heard by said one device as network members.

Each device may schedule said each device's beacon frame broadcasting based on the beacon frames of other devices heard at said each device.

Each device may schedule said each device's next beacon frame broadcasting based on a random time slot chosen about a mean broadcast period.

The beacon frame of each device may comprise synchronization information.

The synchronization information in a beacon frame of each device may comprise scheduled next beacon frame broadcast time information of said each device.

The synchronization information in a beacon frame of each device may comprise scheduled next beacon broadcast time information of other devices who's beacon frames have been heard by said each device.

Data exchange coordination information may be transmitted by the devices in the beacon frames.

The data exchange coordination information may be in the form of control fields piggy-bagged on the beacon frames.

The control fields may comprise data associated with one or more of a group consisting of a request for data transmission permission, a granting of a data transmission request; an indication that a current beacon frame will be followed by a data transmission, an acknowledgement of successful transmission, and an acknowledgement of unsuccessful transmission.

One device may proceed to transmit a data packet outside a beacon frame broadcast after a data transmission approval is received from a receiving device to which the data packet is to be sent.

A network member list may be maintained and updated by each device for the dynamic network centered around said each device.

A wireless medium usage forecast list may be maintained and updated by each device for the dynamic network centered around said each device.

In accordance with a second aspect of the present invention there is provided a decentralised wireless network comprising a plurality of devices, each device broadcasting beacon frames, listening for beacon frames of other devices, and identifying other devices who's beacon frames have been heard by said each device; and at least two dynamic networks, each dynamic network being centred around one of the devices and having other devices who's beacon frames have been heard by said one device as network members.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION OF THE PREFERRED EMBODIMENTS

Figure 1:
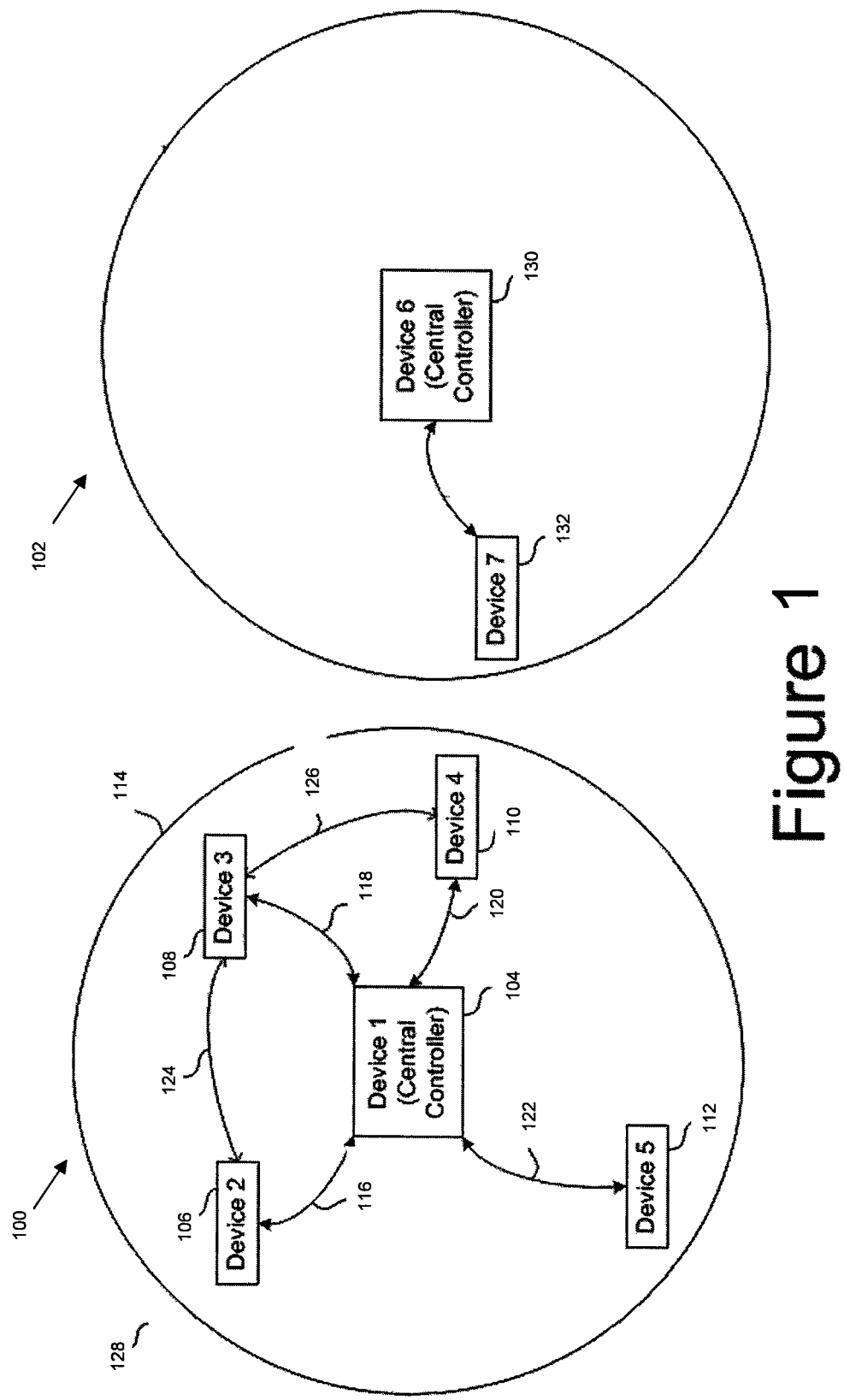
FIG. 1 is a diagram showing wireless devices connected to two different central controllers in two separate typical networks.

The example embodiment described herein can provide a method and system for addressing one or more of the above-mentioned problems in an ad hoc medium access control (MAC) scheme.

The network topology in this example embodiment shown in FIG. 2(a). As illustrated in FIG. 2(a), no centralized control mechanism is required. In the wireless environment (200) in FIG. 2(a), 7 devices are defined and placed in the same positions as the devices in FIG. 1. The 7 devices are device 1 (210), device 2 (220), device 3 (230), device 4 (240), device 5 (250), device 6 (260) and device 7 (270). The wireless coverage of these devices are defined by, for example circles (211), (221), (231), (241), (251), (261) and (271) respectively.

Based on the wireless coverage shown in FIG. 2(a), the connectivity/visibility of each device to another is tabulated in FIG. 2(b). In the visibility table (280) in FIG. 2(b), a tick indicates visibility between the row device and the column device. A cross indicates that the row device and column device are out of range.

From the visibility table (280) in FIG. 2(b), a network membership table (290) can be constructed as shown in FIG. 2(c). When a device is visible, the broadcast beacon from that device can be heard, and thus can be considered a network member by any devices that can hear its beacon. In the network membership table (290) as shown in FIG. 2(c), all devices that are visible (and hence a member device) to each device in the wireless environment (200) as shown in FIG. 2(a) are tabulated.

Previously using a centralized control protocol, as shown in FIG. 1, device 4 (110) and device 7 (132) are unable to communicate (although wirelessly they are in range) due to the fact that they belong to different networks, or more specifically in this example embodiment, different WPANs, for example (100) and (102). Using a decentralized control protocol in this example embodiment, as shown in FIG. 2(a), device 7 (270) belongs to device 4's (240) network (241), as shown in network membership table (290) in FIG. 2(c). Likewise, device 4 (240) belongs to device 7's (270) network (271), as shown in network membership table (290) in FIG. 2(c). Since every device is now able to communicate with any device that is a member of their network, device 4 (240) and device 7 (270) are now able to communicate in the example embodiment. Decentralized control protocol may thus solve the problem as previously highlighted in FIG. 1.

In the example embodiment, a decentralised control scheme has been developed for use in a MAC layer. In a decentralised control network, there is no central controller to allocate network time or manage the sharing of the bandwidth. Distributed media access protocol is used whereby each device follows a standard media access protocol to manage its own network access time.

In the example embodiment, each device can implement its own control system, independent of other devices in the decentralised network. In the example embodiment, at the network level, the network comprises a Network Management Protocol (NMP) and a Data Exchange Coordination Protocol (DECP) to define a minimum set of decentralized control protocol for ad hoc wireless communication.

In this example embodiment, beacon frames are commonly used by devices to broadcast information. A beacon frame is a control data frame broadcasted by every device to advertise their existence, announce their scheduled next broadcast time as well as announcing their neighbour devices' scheduled next beacon broadcast time to serve as an advice to other devices to not to try to transmit beacon or data at that time. In addition, the beacon frame is also used to send handshake signals to coordinate the set up and the maintenance of isochronous data transfer session. It is the only control frame that is sent between any devices in the network. Any other frames are considered as data frames. In the example embodiment, every device can broadcast its beacon frame at the same period interval. The period of time between consecutive beacons is known as the superframe. In other words, every device's superframe duration may be equal. In addition, the superframe may be divided into a fixed number of equal medium slots (MS). The DECP can maintain the MS start time between different devices.

As mentioned above, in this example embodiment, for every device, medium access time may be divided into a fixed-sized superframe. As illustrated in FIG. 3(a), each superframe (300), may itself be divided into a finite number (MaxNumMS) of MSs, for example (302) and (304), of duration MaxMSLength (320) each. With reference to FIG. 3(b), the value of MaxMSLength (320) will be explained in later paragraphs. It is noted that the value of MaxMSLength (320) may depend on other PHY constants and variables that. In the example embodiment, the exact value of MaxNumMS is flexible and is implementation and PHY dependant. In the example embodiment, the first MS (301) of a device's superframe (300) is used for beacon transmission. In the example embodiment, only the MS start time will be synchronized between devices but not the superframe start time.

In the example embodiment, the device may choose an available MS to broadcast its beacon. In the example embodiment, with reference to FIG. 3(b), to broadcast a beacon, a device may generate a random delay in the range between zero and a predefined constant so as to generate a beacon contention window, MaxBeaconCW (322). The device may then continue listening to the medium and proceed to count down the random delay. If the countdown reaches zero and if no other beacons are heard during the countdown, the device may proceed to transmit its beacon.

Conversely, if the medium is sensed to be busy before the countdown reaches zero, the countdown may then be temporarily suspended until the start of the next MS. When the next MS starts in the example embodiment, the countdown may be resumed and may continue until the beacon is transmitted. A reason for resuming the countdown instead of restarting it in the example embodiment is to give priority to devices that are supposed to broadcast their beacons but were interrupted by yet other earlier scheduled beacons or data transmissions.

With reference to FIG. 3(b), MaxMSLength (320) is derived from MaxBeaconCW (322), MaxBeaconTXTime (324) and RXTXTurnaroundTime (326). As previously described, MaxBeaconCW (322) is the maximum beacon contention window in the example embodiment. This may be the upper-bound value for the generation of a random delay prior to the broadcast of a beacon. In the example embodiment, MaxBeaconTXTime (324) may be the maximum amount of time required for the complete transmission of a beacon frame while RXTXTurnaroundTime (326) may be the maximum time required by the PHY to change from receiving to transmitting the start of the first symbol of each beacon frame.

Figure 3:
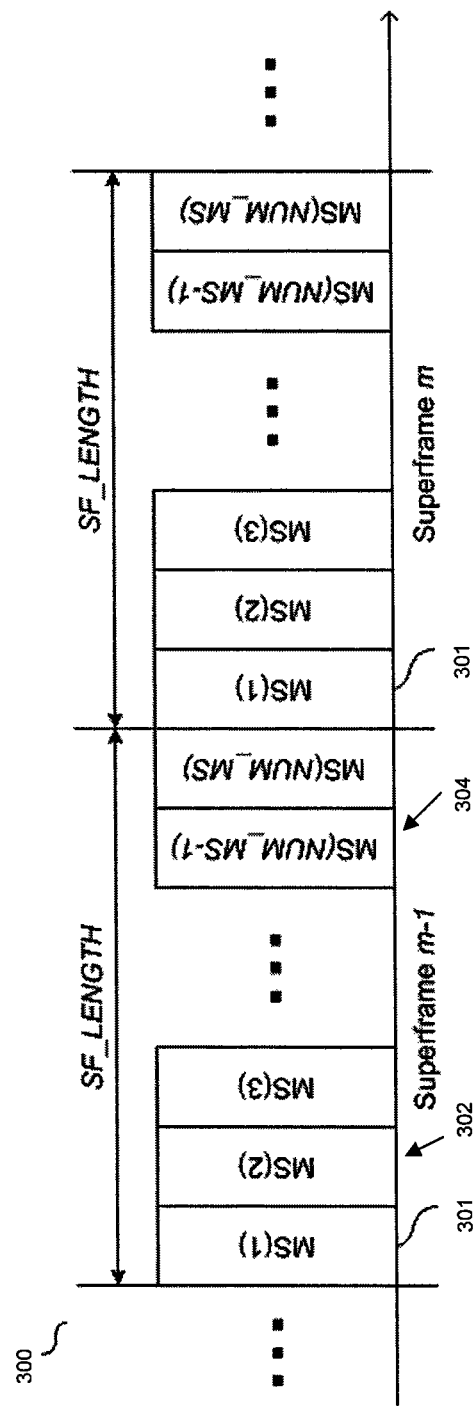
FIG. 3(a) is an illustration of superframes divided into medium slots (MSs) in an example embodiment.
FIG. 3(b) is an illustration of the composition of duration MaxMSLength in each medium slot in an example embodiment.
FIG. 3(c) is a linear time graph showing wireless medium usage by devices to broadcast beacon frames in an example embodiment.
Figure 3:
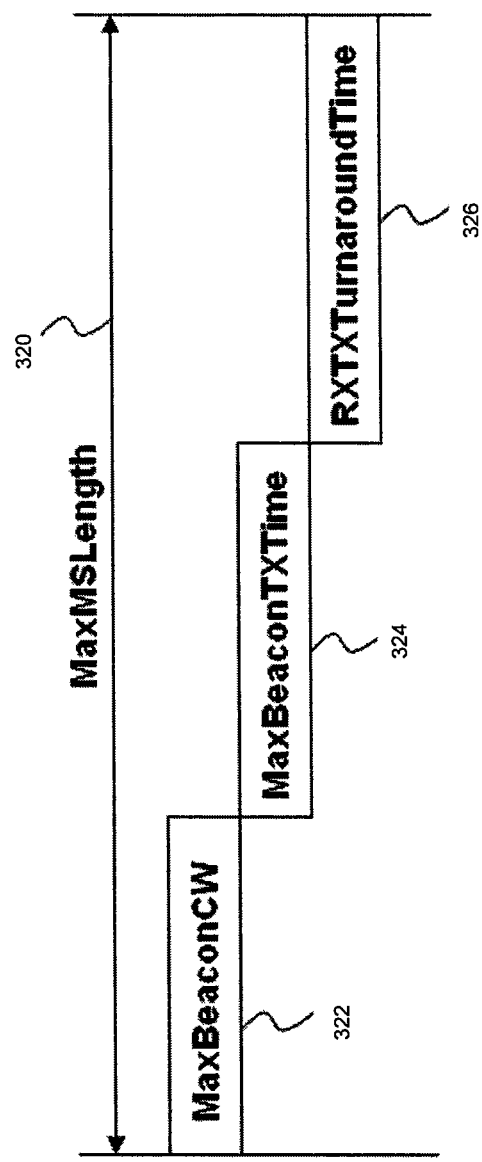
Figure 3:
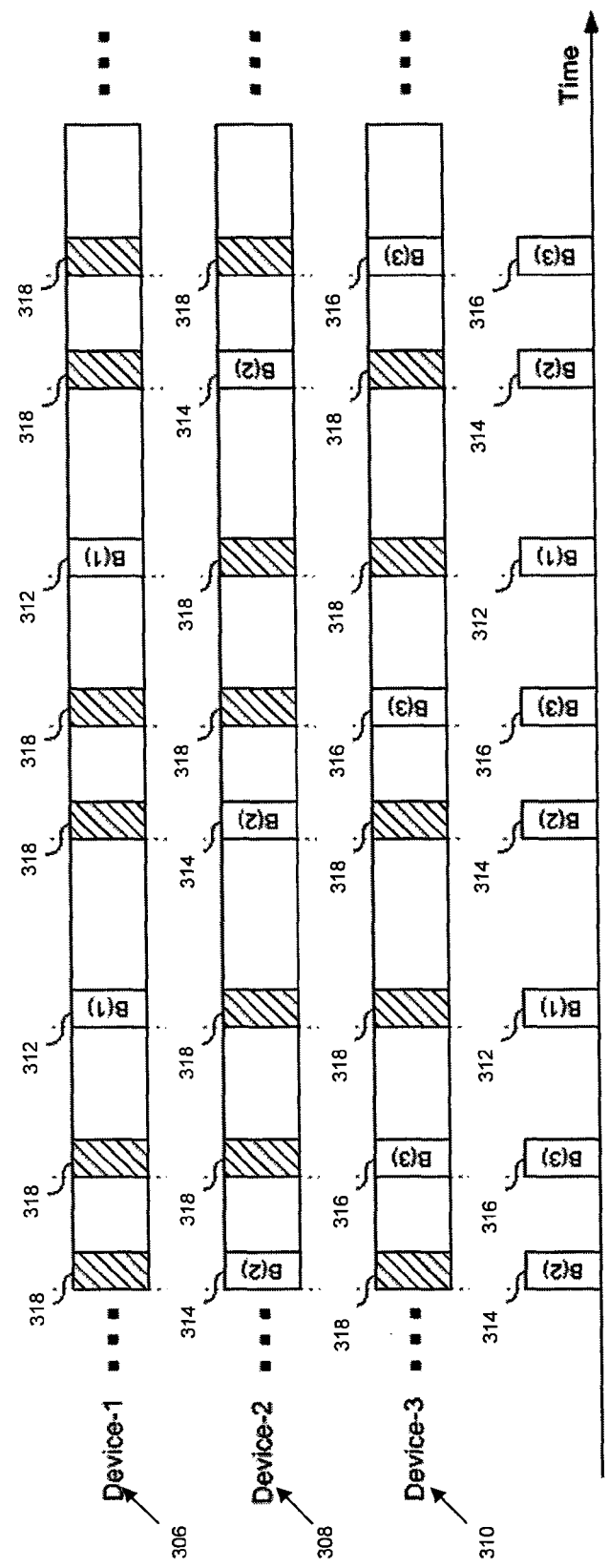

In the example embodiment, synchronization of MS start times means that every device may transmit beacons periodically and independently from other devices, as shown in FIG. 3(c). With reference to FIG. 3(c), 3 devices, namely device-1 (306), device-2 (308) and device-3 (310) are shown to be broadcasting beacons, for example, (312), (314) and (316) respectively, at different start times. Note that in the example embodiment, devices will avoid broadcasting beacons at slots, for example (318), that may be known to be used by other devices.

In the example embodiment, every device can define a wireless network centred around itself where each network may be maintained by the NMP. This arrangement may include the broadcasting of beacon frames in a distributed manner and the maintenance of a dynamic list of devices whose beacon frames can be heard by the local device. In addition, the NMP may define a method of beacon collision resolution.

In the example embodiment, the DECP can provide a protocol where data may be exchanged. The protocol may define two methods whereby data can be exchanged. One method is via a random access method while the other method is via channel time reservation using beacons. It is noted that the second method using beacons may be useful for devices that need to exchange data on a periodic basis.

Figure 4:
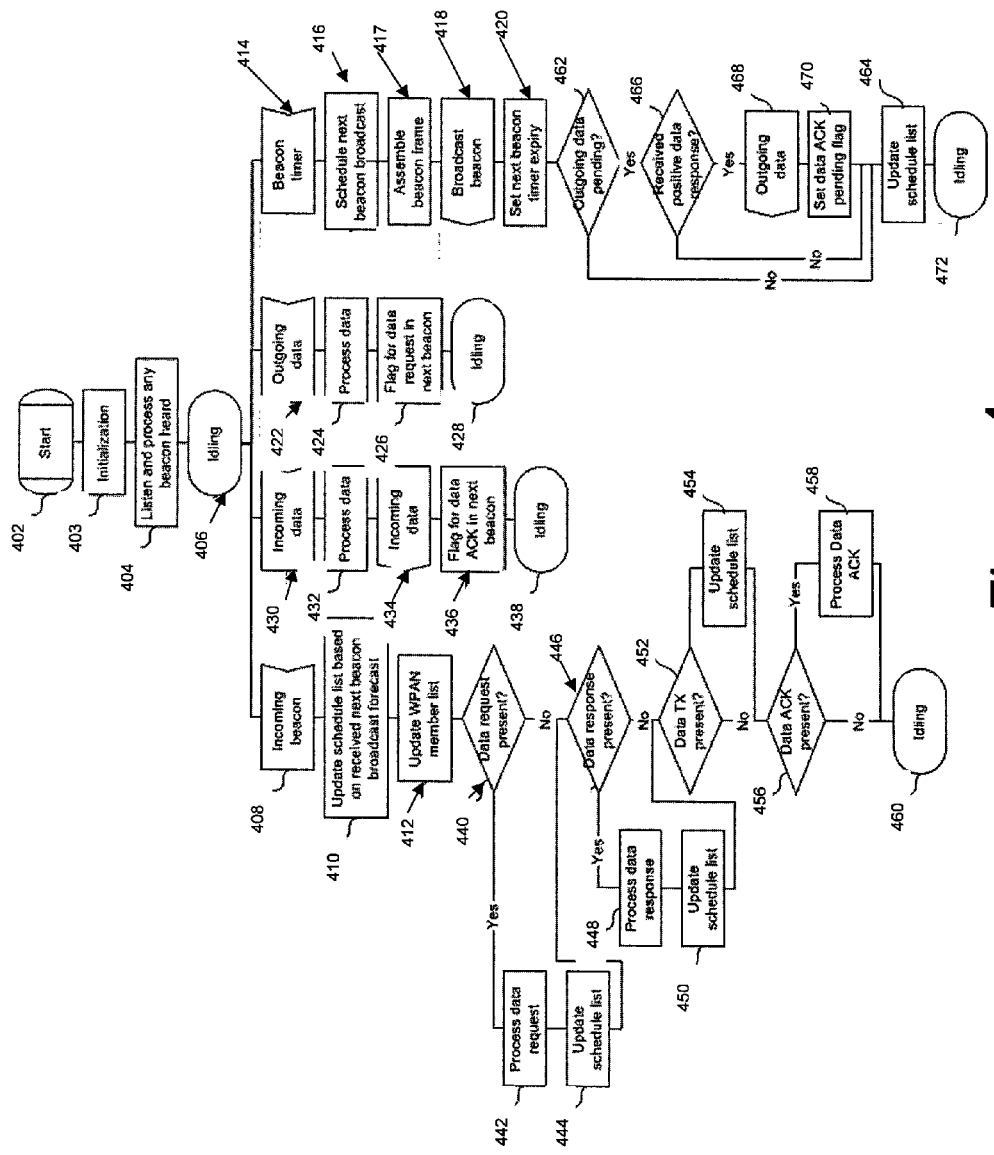
FIG. 4 is a schematic flowchart showing the processes of device communications in an example embodiment.

With reference to FIG. 4, in the example embodiment, upon power up (402), a device, using the NMP, proceeds to (403) initialization of itself and listening (404) on the communication medium for at least 2 superframes for the beacons of other devices. During instances where there are no broadcasts scheduled by all the devices in a network, the device will enter an idling mode (406) after listening (404) on the communication medium. With reference to FIG. 4, in the example embodiment, during idling (406), every device may be listening (404) to the wireless medium as described previously for beacon broadcasts from new or old devices to their network to note beacon scheduling times of the devices, DECP control parameters, and also for any data packet that might be sent to them. In the example embodiment, devices can choose to operate in a power saving mode. In this option, idling devices are not required to listen to the wireless medium for the entire superframe duration. In the example embodiment, devices in the power saving mode wake up periodically to transmit their beacons and listen to a pre-defined window for any requests for the devices to wake for data exchange. If there are beacons heard, the device will take note of the device presence information as well as the next beacon transmission schedule of other devices, if any, that is included in each beacon. In addition, if there are beacons heard, the device will synchronize its own MS start time with the beacon with the earliest clock. The synchronization process is further described later. In the event where there are no beacons heard, the device may set its own MS start time.

The NMP, which may be implemented by every device independently, can handle the channel time management, beacon broadcast scheduling as well as dynamically update member devices in its own network. In the example embodiment, it is also responsible for advertising itself in the wireless environment as well as discovering other nearby wireless devices. To resolve the problem of possible interference that may be faced in situation where two devices that are out of range of each other but are both in range with the local device and both trying to broadcast their beacons at the same time, the local device may also include in its beacon any next beacon broadcast schedule that it has heard.

In the example embodiment, as illustrated in FIG. 4, the NMP starts by first listening (404) to the wireless medium to find out if there are any other devices currently broadcasting beacons. Upon receiving any incoming beacons (408), the NMP will update the device schedule list based on any received next beacon broadcast forecast (410). Subsequently, in the example embodiment, the devices broadcasting any incoming beacons received at stage (408), as the NMP updates the device (412) member list. For example, for a single beacon received, the scheduled next broadcast times of that device sending out the beacon and any other neighbouring devices also included in the beacon, as well as data exchange control information will be noted by the NMP.

In the example embodiment, with the information received from the beacons by other devices, if any, the NMP may initialise the device beacon timer (414) to schedule a time to broadcast a beacon as well as scheduling a time offset from this current beacon broadcast for the next beacon broadcast (416). Both of these processes, example (414) and (416), may be scheduled at a time not already scheduled for beacon broadcast or data transfer by other devices. In scheduling the next broadcast time, for example (416), each device in the example embodiment should generate a random time offset about a mean broadcast period. The mean broadcast period however can change dynamically during operation. The reason for randomization of time offset about a mean broadcast period is to resolve cases when two devices broadcast at the exact same time with an exact broadcast period. In that case, both beacons will always overlap completely and both devices may never get to hear each other's beacon due to endless interference.

With reference to FIG. 4, after scanning the wireless medium and assembling the device beacon frame (417), the NMP in the example embodiment may choose a time period that is not scheduled for beacon broadcast or data transfer, to broadcast the device beacon (418). Through broadcasting this beacon, the network management system achieves the purpose of advertising the local device as well as the next broadcast period of the device. Devices that hear this beacon may avoid contenting the media access at the scheduled next beacon broadcast times included in the beacon. Subsequently, after broadcasting the device beacon (418), the NMP will set the next beacon timer expiry (420).

In the example embodiment, after a device forms a network with some neighbour devices using the NMP, data exchange through a sequence of request, response, transmit and acknowledge is carried out. The beacon frame as previously described is used to transport the DECP control signals. These control signals are required to be received by all listening devices in range and are not limited to only devices participating in the data exchange. In this way, a "hidden terminal problem" and a "visible terminal problem" may be solved. The two above-mentioned problems which may be solved by DECP beacon broadcast in this example embodiment will be described in latter paragraphs.

In the example embodiment, the data request and response control signals of the DECP perform typically like the Request-To-Send/Clear-To-Send (RTS/CTS) in a typical IEEE 802.11 protocol control signal except that the typical RTS/CTS signals in IEEE 802.11 are specific and dedicated control signal frames sent to coordinate data transfer. The data request and response control signals of the DECP in this example embodiment are control signals "piggy-bagged" on top of a beacon frame instead of being specific control signal frames.

Being similar to the RTS/CTS in a typical IEEE 802.11 protocol control signal, the data request and response control signals in the example embodiment may work as follows. With reference to FIG. 4, the originating device that wishes to send outgoing data (422) to the destination device will first process (424) the data to be sent. The originating device will then generate and add on a data request control signal in its next beacon broadcast. This is to include a flag for data request in the device next beacon (426). If there are no other scheduled actions for the originating device, it may enter the idling mode (428). The data request control signal may comprise information on the data to be transferred including data transmission time required and the address of the destination device.

With reference to FIG. 4, the destination device that wishes to receive incoming data (430) may provide a reply on its next beacon by generating and adding on a data response control signal in its next beacon broadcast. This is to include a flag for data acknowledgement in the device next beacon (436). If there are no other scheduled actions for the destination device it may enter the idling mode (438). This data response control signal may comprise of whether the data request control signal has been granted or not and if granted, the data response control signal may include the data transmission time allowed and the address of the originating device.

In the example embodiment, with reference to FIG. 4, for a device that has received an incoming beacon (408), after the NMP updates the device number list (412) the NMP will determine if there is any data request present in the beacon. If there is any data request present, the DECP will process the data request (442) and will update the device schedule list (444). After the NMP determines if there is any data request (440), it will next determine if there is any data response present (446). If there is any data response available, the DECP will process the data response (448) and will update the device schedule list (450). The NMP will next determine if any data transmission is available (452) in the incoming beacon. If there is, the NMP will update the device schedule list (454). The NMP will then determine if there is any data acknowledgement present (456). If there is any data acknowledgement present, the DECP will process the data acknowledgement (458). In the event where there are no other scheduled actions for the device receiving the incoming beacon at stage (408), the device actions for the device receiving the incoming beacon at stage (408), the device may enter the idling mode (460).

In the example embodiment, with reference to FIG. 4, for a device that has broadcasted its beacon at stage (418) and after it has set the next beacon timer expiry (420), the NMP will determine if the device has any pending outgoing data (462). If there is not, it will proceed to update the device schedule list (464). If there are any pending outgoing data at stage (462), the NMP will determine it has received any positive data response (466). If there is no positive data response at stage (466), the NMP will proceed to update the device schedule list (464). If there is any positive data response at stage (466), the DECP will process the outgoing data (468) and set the data acknowledgement pending flag (470). The NMP will then proceed to update schedule list (464). In the event where there are no other scheduled actions for the device that has broadcasted its beacon at stage (418), the device may enter the idling mode (472).

Figure 2:
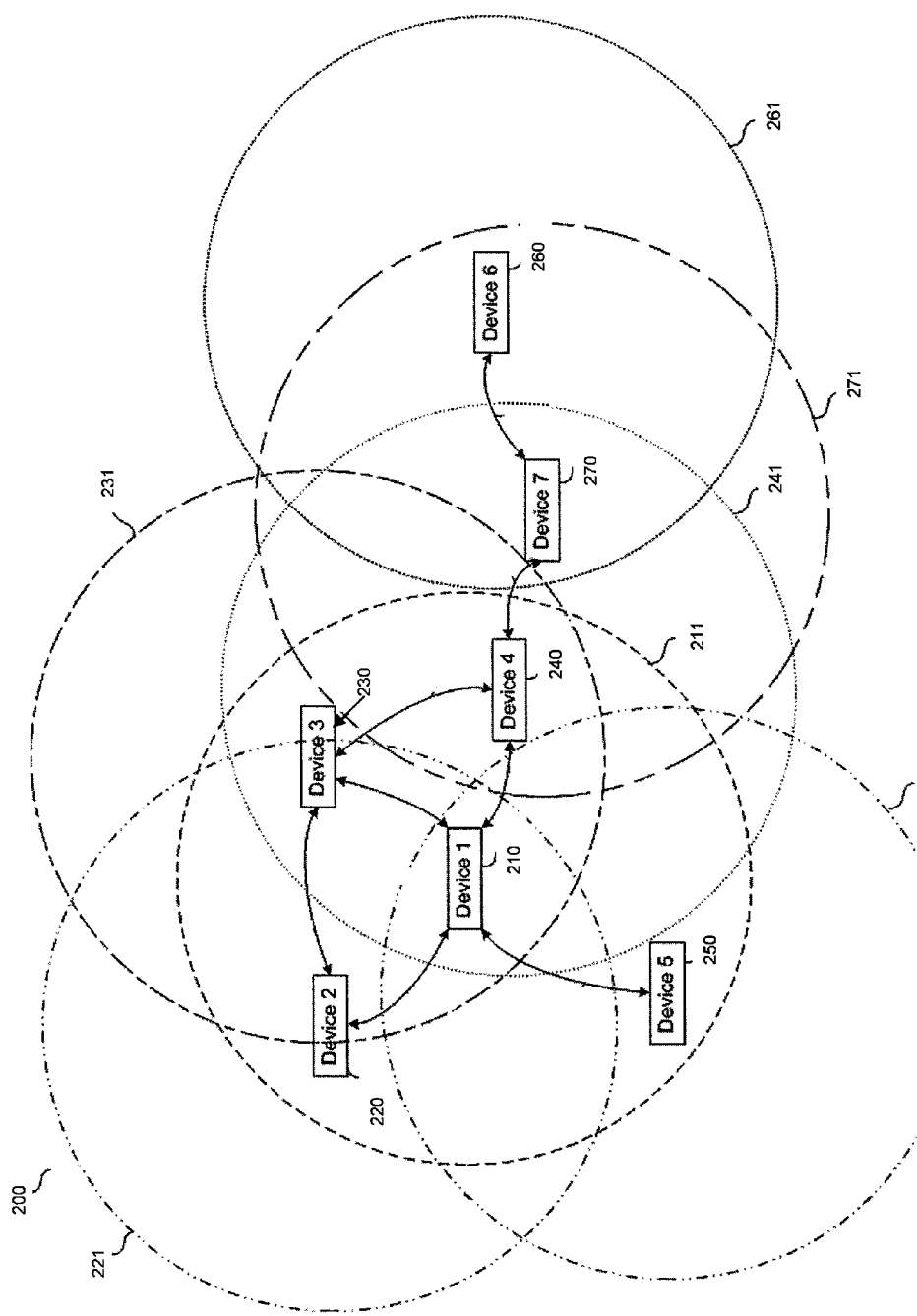
FIG. 2(a) is a diagram showing wireless devices communicating without any central controllers in an example embodiment.
FIG. 2(b) is a visibility table showing which device is in range of which other devices in an example embodiment.
FIG. 2(c) is a network membership table showing the member network devices of each device in an example embodiment.

In the example embodiment, for devices that failed to hear this beacon, there are a few possibilities. The first possibility is that such devices are out of range. In this case, since beacons from such devices will not be heard by the local device and this means that the remote devices will not contribute to any interference at the receiver of the local device. With reference to FIG. 2(*a*), two such pairs of device are device 5 (250) and device 6 (260), and device 1 (210) and device 7 (270).

Another possibility why devices might not be able to hear the beacon broadcasted by a local device may be due to interference by other transmitting devices also in range. These interfering devices may fall into 2 categories.

The first category may comprise devices that are not using the media access protocol of the present invention. Depending on the protocol used by these devices (which can be a very broad range), different coexistence mechanism may be incorporated into the protocol as described in the example embodiment. However, this is not currently in the scope of the present invention.

The other category of devices may comprise of devices using the media access protocol of the example embodiment. There are a couple of reasons why these devices using the same protocol might be interfering with the current beacon broadcast of the local device despite the fact that they are in range and should not be transmitting anything during this time.

One reason may be that this interfering device is out of range of the device that is broadcasting its beacon but both devices are transmitting to a common device in range. With reference to FIG. 2(*a*), consider device 1 (210), device 3 (230) and device 5 (250). Interference will occur at receiving device 1 (210) when device 3 (230) and device 5 (250) are broadcasting beacons at relatively close timing.

Another reason why devices using the protocol in this example embodiment might be interfering with the current beacon broadcast of a device may be due to the fact that the interfering device and/or the beacon broadcasting device has just arrived into radio range of the receiving device.

However, in both cases described above, the current beacon being broadcasted may be missed but the randomization of the beacon broadcast time will ensure that both the interfering and broadcasting devices will eventually broadcast their beacons at a different time in the example embodiment. Synchronization of broadcasting may then be maintained subsequently.

In the example embodiment, in the case where the interfering device and the beacon broadcasting device are out of range of each other but both broadcasting to a receiving device in range of both, once both their beacons are broadcasted at a different time due to randomization, the receiving device will be able to hear both the beacons and will broadcast its beacon together with the scheduled next beacon broadcast time of itself and the two broadcasting devices. Both devices may then be able to hear that beacon and avoid interference from then on, thus implementing synchronization of broadcasting.

In the example embodiment, for the case where interference happened because both interfering devices have just arrived into range, the moment both interfering devices start broadcasting their beacons at different times due to randomization, each will hear the beacon of the other device and make adjustments to its beacon scheduling to ensure no interference thereafter.

Figure 5:
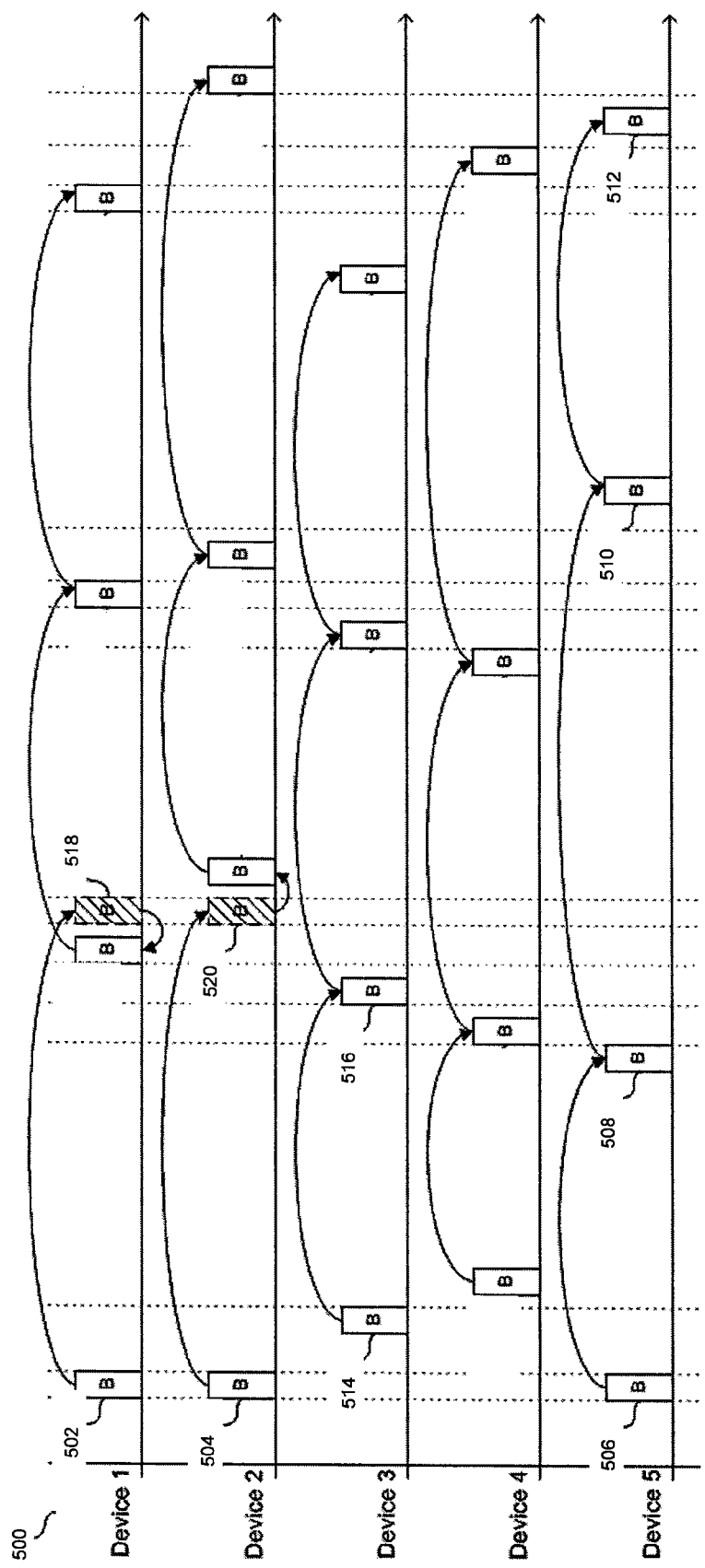
FIG. 5 is a linear time graph showing wireless medium usage by devices to broadcast beacons frames and perform data exchange in an example embodiment.

FIG. 5 illustrates how a beacon is scheduled by the NMP in the example embodiment and broadcasted by the network management system by means of a linear time graph (500). The blocks marked by the letter 'B' are beacon frames broadcasted in the wireless medium. In this illustration, device 1 (210), device 2 (220), device 3 (230), device 4 (240) and device 5 (250) from FIG. 2(*a*) are considered for their relative positions to one another. For illustration in FIG. 5, it is assumed that all these devices are being switched on at the same time.

In an arbitrary situation, device 1 (210), device 2 (220) and device 5 (250) may broadcast their beacons, for example (502), (504) and (506) respectively as illustrated in FIG. 5, at the same time. Device 5 (250), after broadcasting beacon (508) (i.e. no longer interfering with device 1's (510) beacon), can always hear beacons from device 1 (210) since there are no other interfering devices in its range as illustrated in FIG. 2(*a*). Therefore its subsequent beacons, for example (510) and (512), will not interfere with device 1's (210) beacons.

With reference to FIG. 2(*a*), for device 3 (230), it is unable to hear device 1's (210) and device 2's (220) beacons, for example (502) and (504) respectively due to interference as illustrated in FIG. 5, as it is noted that both beacons, for example (502) and (504), are broadcasted at the same time. Device 4 (240) is able to hear device 1's (210) beacon (502) because device 2 (220) is out of range. In addition, device 4 (240) is able to hear device 3's (230) beacon (514) and thus able to schedule itself such that its beacon broadcast will not clash with beacon (516).

Due to randomization in this example embodiment, device 3 (230) will not interfere with device 1 (210) and device 2 (220) beacons, for example (518) and (520) respectively. Thereafter, device 1 (210) and device 2 (220), after hearing device 3's (230) beacon (516) will shift their beacons (for example beacon (518) for device 1 (210) and (520) for device 2 (220) respectively) broadcasts to avoid any interference problems. After device 2's (220) beacon (520) is broadcasted, the whole system in the example embodiment may then reach a synchronized state in the subsequent beacon broadcasts.

Figure 6:
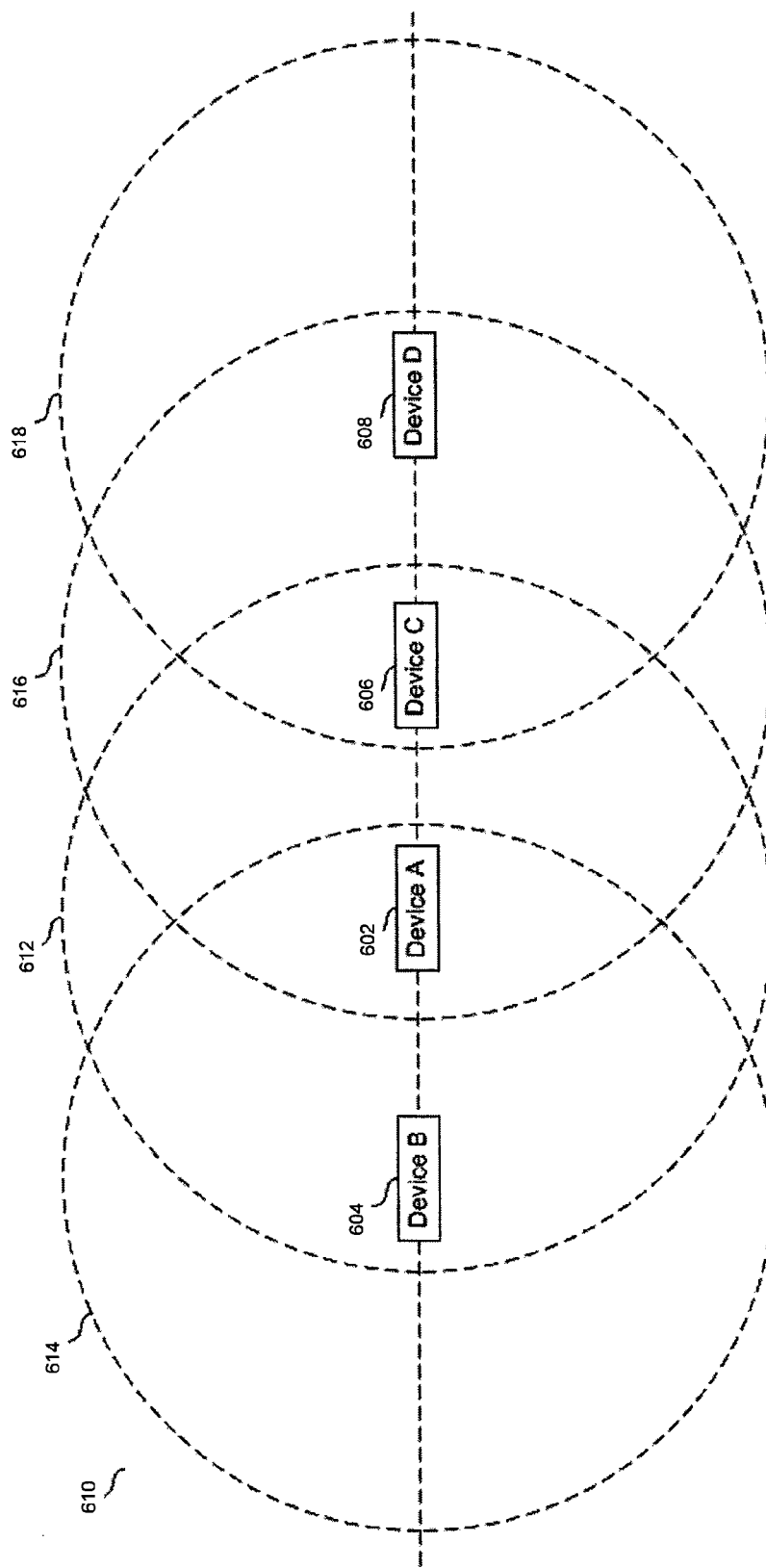
FIG. 6 is a diagram showing the topology of four wireless devices for the purpose of explaining a "hidden terminal problem" and a "visible terminal problem" solved in an example embodiment.

FIG. 6 illustrates a "hidden terminal problem" and a "visible terminal problem" that may be solved by the DECP in the example embodiments. Consider 4 wireless devices, namely device A (602), device B (604), device C (606) and device D (608) lying in a straight line in the wireless space (610), and whose wireless range are denoted by the circles, for example (612), (614), (616) and (618) respectively.

With reference to FIG. 6, a "hidden terminal problem" will occur if both device B (604) and device C (606) are to transmit information to device A (602) simultaneously. This may be due to the fact that device B (604) and device C (606) are out of range of each other and hence have no means of directly communicating their intention of transmitting information to device A (602).

In a similar arrangement, when device A (602) wishes to transmit information to device B (604) and since device C (606) is within device A's (602) range, device C (606) will detect device A's intention to transmit information. Consider the situation where device C (606) wishes to transmit information to device D (608). However, due to its knowledge that device A (602) is transmitting information to a device B (604) but does not have the knowledge that device B (604) is out of range of itself and also that device D (608) is out of range of device A (602), it will not proceed to transmit any information to device D (608) to avoid any potential interference. This problem of withholding transmission when there is no interference problem is typically known as a "visible terminal problem".

With regards to the "hidden terminal problem", the DECP may be able to solve this problem by providing devices that cannot hear the originating device, but being in range of the destination device, with the details of any information exchange that may be about to take place through the beacon broadcast. These other devices may then adjust their beacon broadcast schedules as well as any similar scheduling to send data to the destination device, thus solving the abovementioned problem.

With regards to the "visible terminal problem", the DECP may be able to solve the problem by informing devices that are in range of the originating device but not in range of the destination device. This may be done by broadcasting the relevant addresses via the originating device's data response that the destination device is out of range. These devices will then have the knowledge that no interference will result if data beacon broadcast or data exchange to another nearby device is performed, thus solving the abovementioned problem.

Figure 7:
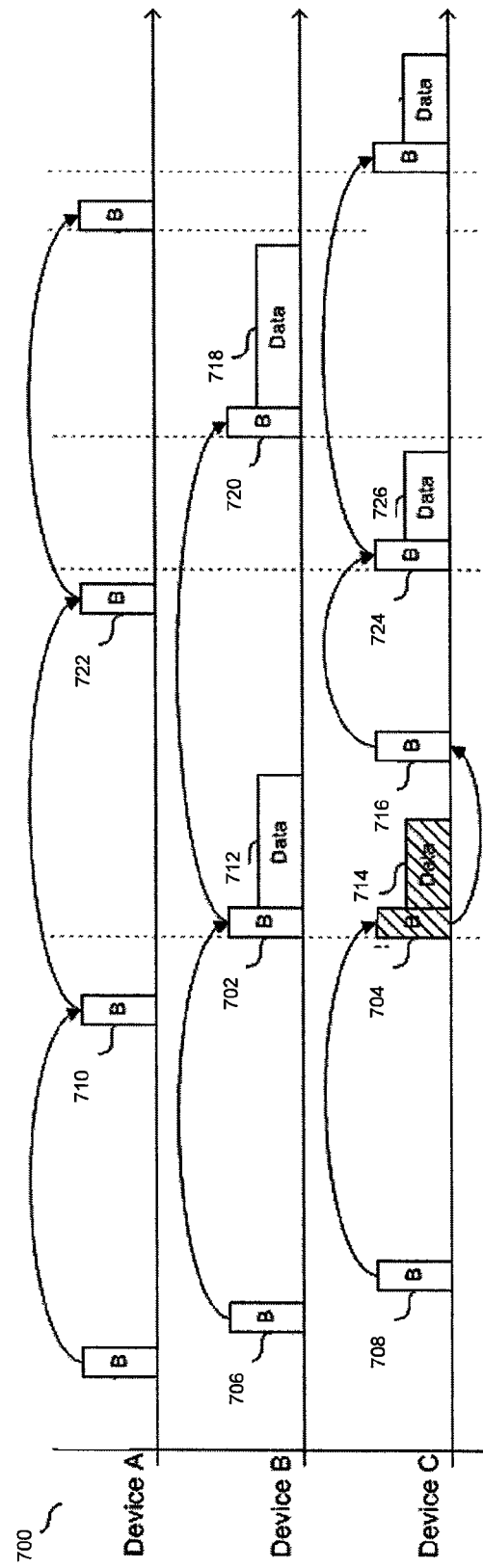
FIG. 7 is a diagram showing wireless medium usage by three devices to broadcast beacons frames at different start times in an example embodiment.

FIG. 7 illustrates data exchange between three devices, with reference to FIG. 6 for their network topology. With reference to FIG. 7, there is illustrated a linear time graph (700) on how data exchange takes place for 3 devices, namely device A (602), device B (604) and device C (606), with reference to FIG. 6 for their relative positions. In FIG. 7, consider the case where both device B (604) and device C (606) are scheduling transmission of data to device A (602) at the same time, for example scheduled beacon slots (702) and (704) respectively. Device B (604) and device C (606) will both tag the data request control field onto their beacons, for example, (706) and (708) respectively as shown in FIG. 7. In this example embodiment, device A (602) accepts the data request from device B (604) and provides a data response in its next beacon (710) comprising a positive data response to device B (604) and a negative data response to device C (606).

Subsequently in the example embodiment, device C (606) will receive information that its data request was rejected and also information that device B (604) will be broadcasting its beacon (702) followed by data transmission in data slot (712) to device A (602). This information is deduced from the next beacon broadcast schedule of device B (604) and positive data response to device B (604) broadcast by beacon (710) from device A (602). Device C (606) will therefore not broadcast its beacon at the next scheduled slot (704). Device C (606) will also not transmit data to device A (602) in its requested but rejected data slot (714). Device C will instead reschedule its next beacon broadcast to an available slot (716). In this beacon timing (716), device C (606) will continue to send its data request signal to device A (602).

Concurrently, in the example embodiment, Device B (604), having received a positive data response from beacon (710) of device A (602), will proceed to broadcast its beacon (702) as well as to transmit data in data slot (712) to device A (602). It may further generate a new data request signal in beacon (702) to send another data packet in its next data slot (718), after its next scheduled beacon (720).

Following synchronization of device B (604) and device C (606), during device A's (602) next beacon broadcast (722), device A (602) may grant both device C's (606) and device B's (604) data requests made in beacons, for example, (716) and (702) respectively. Device C (606) and device B (604) can then proceed to broadcast their beacons, for example, (724) and (720) respectively, followed by data transmission at their data slots, for example, (725) and (718) respectively.

Figure 8:
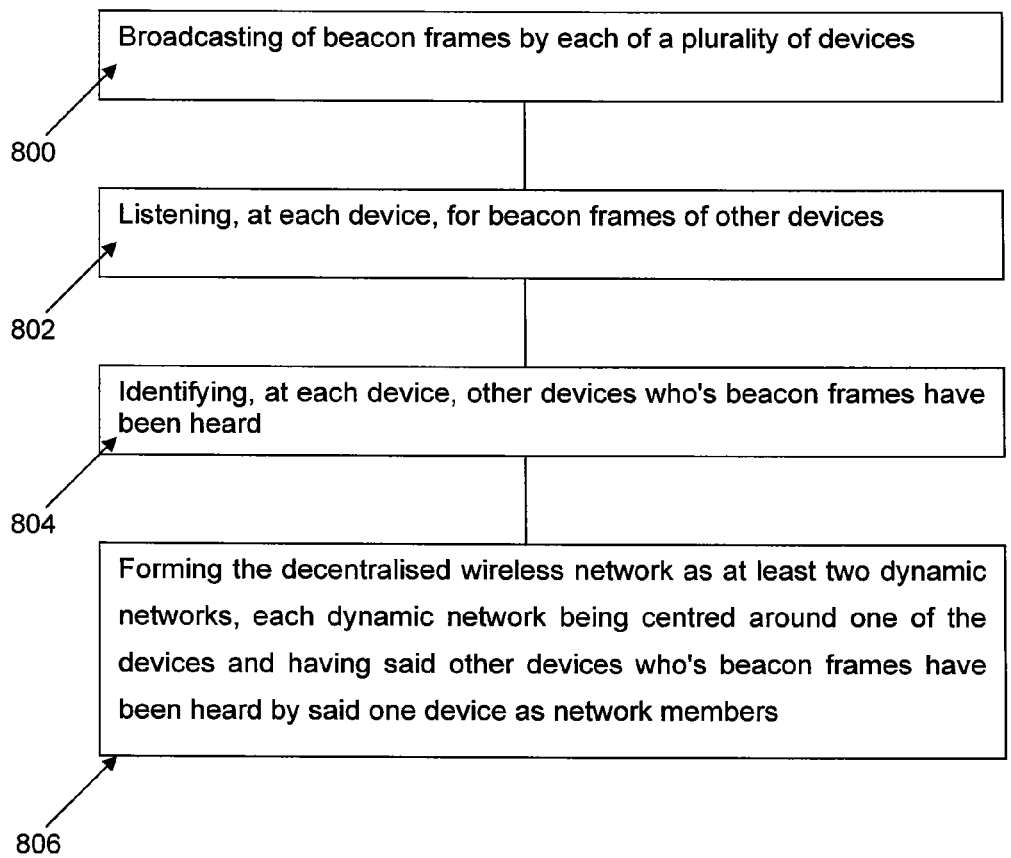
FIG. 8 shows a flowchart illustrating a method of wireless medium access for establishing a decentralised wireless network in an example embodiment.

FIG. 8 shows a flowchart illustrating a method of wireless medium access for establishing a decentralised wireless network in an example embodiment. At step (800), beacon frames are broadcasted by each of a plurality of devices, and at step (802), each device is listening for beacon frames of other devices. At step (804), each device, is identifying other devices who's beacon frames have been heard, and at step (806), the decentralised wireless network is formed as at least two dynamic networks, each dynamic network being centred around one of the devices and having, said other devices who's beacon frames have been heard by said one device as network members.

With the protocols described above in the example embodiments, devices can enter the wireless space of several devices, start to discover them and may exchange information quickly without the concept of "connecting to a network" or be limited to the limitations of a centralised controller. Decentralized ad hoc medium access control may be thus be achieved in the example embodiments above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed:

1. A method of wireless medium access for establishing a decentralized wireless network, the method comprising:
   broadcasting of beacon frames by each of a plurality of devices;
   listening, at each device, for beacon frames of other devices;
   identifying, at each device, other devices whose beacon frames have been heard; and
   forming the decentralized wireless network functioning without a central controller, the decentralized wireless network in the form of at least two dynamic networks, each dynamic network being centered around one of the devices and having said other devices whose beacon frames have been heard by said one device as network members; and wherein at least one of the network members is in communication range of the at least two dynamic networks;

wherein the beacon frame of each device comprises synchronization information, the synchronization information comprises scheduled next beacon frame broadcast time information of said each device and scheduled next beacon frame broadcast time information of other devices whose beacon frames have been heard by said each device; and wherein the broadcast of each beacon frame at the scheduled broadcast time by each device is subjected to a random delay such that, for each device, every pair of consecutive broadcast periods vary from each other, wherein said broadcast period is a period between consecutive beacon frames broadcasted by the device.

2. The method as claimed in claim 1, wherein each device schedules said each device's beacon frame broadcasting based on the beacon frames of other devices heard at said each device.

3. The method as claimed in claim 1, wherein each device schedules said each device's next beacon frame broadcasting based on a random time slot chosen about a mean broadcast period.

4. The method as claimed in claim 1, wherein the synchronization information of each device is generated based on its scheduled next beacon frame broadcast time information and the beacon frames received from said other devices comprising said scheduled next beacon frame broadcast time information.

5. The method as claimed in claim 4, wherein each device maintains a dynamic list of devices whose beacon frames can be heard by said each device, and the dynamic list is updated based on said scheduled next beacon frame broadcast time information in the beacon frames received from said other devices.

6. The method as claimed in claim 1 wherein data exchange coordination information is transmitted by the devices in the beacon frames.

7. The method as claimed in claim 6, wherein the data exchange coordination information is in the form of control fields piggy-bagged on the beacon frames.

8. The method as claimed in claim 7, wherein the control fields comprise data associated with one or more of a group consisting of a request for data transmission permission, a granting of a data transmission request; an indication that a current beacon frame will be followed by a data transmission, an acknowledgement of successful transmission, and an acknowledgement of unsuccessful transmission.

9. The method as claimed in claim 6, wherein one device proceeds to transmit a data packet outside a beacon frame broadcast after a data transmission approval is received from a receiving device to which the data packet is to be sent.

10. The method as claimed in claim 1, wherein a wireless medium usage forecast list is maintained and updated by each device for the dynamic network centered around said each device.

11. A decentralized wireless network that functions without a central controller comprising:

a plurality of devices, each device broadcasting beacon frames, listening for beacon frames of other devices, and identifying other devices whose beacon frames have been heard by said each device;

at least two dynamic networks, each dynamic network being centered around one of the devices and having other devices whose beacon frames have been heard by said one device as network members; and wherein at least one of the network members is in communication range of the at least two dynamic networks, wherein the beacon frame of each device comprises synchronization information, the synchronization information comprises scheduled next beacon frame broadcast time information of said each device and scheduled next beacon frame broadcast time information of other devices whose beacon frames have been heard by said each device; and wherein each device is operable to subject the broadcasting of each beacon frame at the scheduled broadcast time to a random delay such that, for each device, every pair of consecutive broadcast periods vary from each other, wherein said broadcast period is a period between consecutive beacon frames broadcasted by the device.

12. The decentralized wireless network as claimed in claim 11, wherein each device schedules said each device's beacon frame broadcasting based on the beacon frames of other devices heard at said each device.

13. The decentralized wireless network as claimed in claim 11, wherein each device schedules said each device's next beacon frame broadcasting based on a random time slot chosen about a mean broadcast period.

14. The decentralized wireless network as claimed in claim 11, wherein comprises synchronization information of each device is generated based on its scheduled next beacon frame broadcast time information and the beacon frames received from said other devices comprising said schedule next beacon frame broadcast time information.

15. The decentralized wireless network as claimed in claim 14, wherein each device maintains a dynamic list of devices whose beacon frames can be heard by said each device, and the dynamic list is updated based on said scheduled next beacon frame broadcast time information in the beacon frames received from said other devices.

16. The decentralized wireless network as claimed in claim 11 wherein the devices transmit data exchange coordination information in the beacon frames.

17. The decentralized wireless network as claimed in claim 16, wherein the data exchange coordination information is in the form of control fields piggy-bagged on the beacon frames.

\* \* \* \* \*